United States Patent

Maurer

[11] Patent Number: 5,587,075
[45] Date of Patent: Dec. 24, 1996

[54] PRESSURE FILTER

[75] Inventor: Uwe Maurer, Schwelm, Germany

[73] Assignee: Mike Maurer, Schwelm, Germany

[21] Appl. No.: 392,770

[22] PCT Filed: Jun. 21, 1994

[86] PCT No.: PCT/DE94/00705

§ 371 Date: Apr. 13, 1995

§ 102(e) Date: Apr. 13, 1995

[87] PCT Pub. No.: WO95/00229

PCT Pub. Date: Jan. 5, 1995

[30] Foreign Application Priority Data

Jun. 24, 1993 [DE] Germany ............ 43 20 951.3

[51] Int. Cl.⁶ .................................... B01D 29/68
[52] U.S. Cl. .......................... 210/411; 210/413
[58] Field of Search ................... 210/407, 409, 210/411, 413, 414, 415

[56] References Cited

U.S. PATENT DOCUMENTS

| 4,358,370 | 11/1982 | Jameson et al. | 210/415 |
| 5,186,332 | 2/1993 | Hatton et al. | 210/414 |
| 5,193,446 | 3/1993 | Olusczak et al. | 210/411 |
| 5,227,048 | 7/1993 | Seibel et al. | 210/411 |

FOREIGN PATENT DOCUMENTS

| 3734245 | 4/1989 | Germany. |
| 3833807 | 4/1990 | Germany. |

Primary Examiner—W. L. Walker
Attorney, Agent, or Firm—Herbert Dubno

[57] ABSTRACT

Described is a pressure filter comprising a fluid compartment with a fluid inlet, at least one filter surface in the fluid compartment having a plurality of apertures, one side of the filter surface being restricted by the fluid compartment and the other side thereof being restricted by a filtrate compartment having a filtrate outlet, and a backwashing means. The backwashing means includes a backwashing head sweeping over the filter surface and sealing a part thereof with respect to the fluid compartment. It restricts a backwashing compartment having at least one suction chamber open in a slot-like manner to the filter surface and having connected thereto a reject drain. The slot-like aperture of the suction chamber is formed in such a manner that each aperture of the filter surface, independent of its radial position, is swept over by the slot-like aperture approximately in the same space of time. Accordingly, a uniform cleaning process of the filter surface by the backwashing head results.

7 Claims, 4 Drawing Sheets

PRESSURE FILTER

CROSS REFERENCE TO RELATED APPLICATION

This application is a national phase of PCT/DE 94/00705 filed Jun. 21, 1994 based, in turn, upon German National application P 43 20 951.3 filed Jun. 24, 1993 under the International Convention.

FIELD OF THE INVENTION

The present invention is directed to a pressure filter comprising a fluid compartment with a fluid inlet, at least one filter surface within the fluid compartment having a plurality of apertures, one side of the apertures being restricted by the fluid compartment and the other side of the apertures being restricted by a filtrate compartment, said filtrate compartment having a filtrate outlet, and a backwashing means with a backwashing head sweeping over the filter surface and sealing a part of the filter surface with regard to the fluid compartment, said backwashing head restricting a backwashing compartment having at least one suction chamber open in a slot-like manner towards the filter surface and connected to a reject drain.

BACKGROUND OF THE INVENTION

Such a pressure filter is known from EP 0 479 077 A1. This pressure filter works with a continuous cleaning of the filter surface and is especially destined for the separation of solids from suspensions. A plurality of pressure-proof filter elements separating the fluid compartment from the filtrate compartment and forming the filter surface and the backwashing means connected to the reject drain and having a backwashing head sealing a part of the filter surface with respect to the fluid compartment belong to the fundamental construction of such a pressure filter. The backwashing head and the filter surface are movable with respect to one another. The fluid to be filtered is supplied to the pressure filter with a pressure $p_1$ and pressurizes the filter elements with this pressure $p_1$. The filtrate is drained from the filtrate compartment with a lower pressure $p_2$. In the reject drain and the backwashing compartment restricted by the backwashing head a pressure $p_3$ is adjustable which is always smaller than the pressure $p_2$ within the filtrate compartment. A filtration is carried out with the pressure difference between the pressure $p_1$ of the fluid compartment and the pressure $p_2$ of the filtrate compartment, wherein solids are deposited at the filter surface and form a cover layer. This cover layer is continuously cleaned, namely by backwashing, i.e. a conversion of the flow direction through the filter elements. The backwashing occurs at that part of the filter surface which is sealed by the backwashing head with regard to the fluid compartment, i. e. with the pressure difference between the pressure $p_2$ within the filtrate compartment and the pressure $p_3$ within the backwashing compartment. The process of filtration at the remaining filter surface of the pressure filter is not influenced by the backwashing.

According to the known pressure filter the backwashing compartment includes at least one suction chamber open in a slot-like manner towards the filter surface. This suction chamber is formed as longitudinal chamber extending from a central drive shaft for the backwashing head radially outwardly, which is also true for the slot-like aperture. Accordingly, when the backwashing head rotates the slot-like aperture sweeps over the filter surface in the form of a radial beam emanating from the center of the pressure filter. Obviously, when this is the case the apertures disposed at different radial points of the filter surface are exposed to the slot-like aperture or are subjected to the corresponding suction process over different periods of time since, upon rotation of the backwashing head, different radial points of the slot-like aperture move over different distances within the same unit. This has the result that the whole filter surface is unevenly cleaned by the backwashing so that the efficiency of the filter suffers hereby, the filter surface wears early and/or additional still-stand times of the filter occur or additional measures of maintenance have to be carried out.

OBJECT OF THE INVENTION

It is an object of the invention to provide a pressure filter of the cited kind according to which the filter surface can be cleaned especially evenly by backwashing.

SUMMARY OF THE INVENTION

This problem is solved with a pressure filter of the cited kind according to the invention by the feature that the slot-like aperture of the suction chamber is formed such that each aperture of the filter surface, independent of its radial position, is swept over by the slot-like aperture in approximately the same period of time.

It is assured with the inventive solution that each aperture in the filter surface gets approximately the same cleaning time independent of its radial position. In other words, the slot-like aperture is formed such that each radial point of the slot-like aperture sweeps approximately over the same distance within the time unit if the backwashing head for cleaning the filter surface is rotated. By this, the filter surface is uniformly cleaned over its whole surface so that the filter has a good efficiency over a long time of operation and no increased time of still-stand or additional measure of maintenance are necessary in order to subsequently clean insufficiently cleaned portions of the of the filter surface (according to the prior art on account of the increased angular velocity in.

According to an especially preferred embodiment of the invention the slot-like aperture is helically formed, especially in the form of a semi-arc of a helix of about 190°. On account of the different curvature of a helix which decreases outwardly from the center, herewith the effect desired according to the invention results that, upon further movement of the helically formed slot-like aperture, individual points of the aperture in different radial positions pass approximately identical distances (radian measure) within the time unit so that the desired approximately identical cleaning times for apertures with radially different location within the filter surface result. The exact curve form of the helical or lunated aperture can be ascertained immediately by the expert who is active in this field, wherein the invention is not restricted to a special curve form if at least only approximately the above-cited effect is attained.

Another preferred embodiment of the invention is characterized by the feature that the slot-like aperture is formed by a plurality of helically disposed adjacent linear individual slots. Accordingly, in this embodiment no continuous slot-like aperture is present but this continuous aperture is divided into a plurality of individual slots which are separated by webs from one another. The advantage of this embodiment consists in the feature that hereby the surface of the slot-like aperture is reduced whereby a better strength of the backwashing head (distortion-proof embodiment) results. Furthermore, the linear individual slots are disposed in such a manner that, upon rotation of the backwashing head, the complete range of the filter surface is swept over by the individual slots which are arranged with different angles, wherein uniform cleaning times for each aperture of the filter surface are guaranteed simultaneously.

Preferably, the reject drain from the backwashing compartment is conducted through a hollow shaft for driving the backwashing head and from there to the outside of the filter. Of course, the suction chamber associated with the slot-like aperture is formed in such a manner that the reject is correctly discharged towards the hollow shaft, wherein, preferably, the chamber has also a helically shaped curvature in adaption to the slot-like aperture. According to the embodiment with the individual slots the suction chamber is connected to the filter surface to be cleaned only by means of the individual slots.

According to another embodiment of the invention the backwashing head has at least one hollow slat sweeping over the filter surface and provided with the slot-like aperture. The suction chamber is located within this hollow slat. Preferably, the hollow slat is also helically formed. Another embodiment of the invention is characterized by the feature that the hollow slat has a suction portion facing the filter surface and a reject drain portion facing away from the filter surface and conducting the reject (through the hollow shaft) to the reject drain.

According to the inventive pressure filter the backwashing head is preferably rotatable while the at least one filter surface is stationary. However, the opposite case is also possible. However, the backwashing head is preferably rotatable so that in the preceding and following specification only this embodiment is discussed.

According to a special embodiment of the invention the backwashing head comprises exclusively the at least one hollow slat which is appropriately connected to the hollow shaft serving as drive shaft. According to a practical embodiment at least two hollow slats are provided. Dependent on the embodiment, a higher number of hollow slats is also possible. An embodiment is especially suited according to which the at least one hollow slat is supported by a carrier plate. By this, a substantial reinforcement of the backwashing head is achieved. The carrier plate is formed in such a manner that it has recesses between the individual hollow slats in order to enable a contact of the fluid to be filtered with the filter surface.

If the at least one hollow slat is supported by a carrier plate the hollow slat is preferably formed in such a manner that it has a suction portion on the side of the carrier plate facing the filter surface and a reject drain portion on the side of the carrier plate facing away from the filter surface. The reject drain portion forms the connection with the hollow shaft and the reject drain.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

Figure 1:
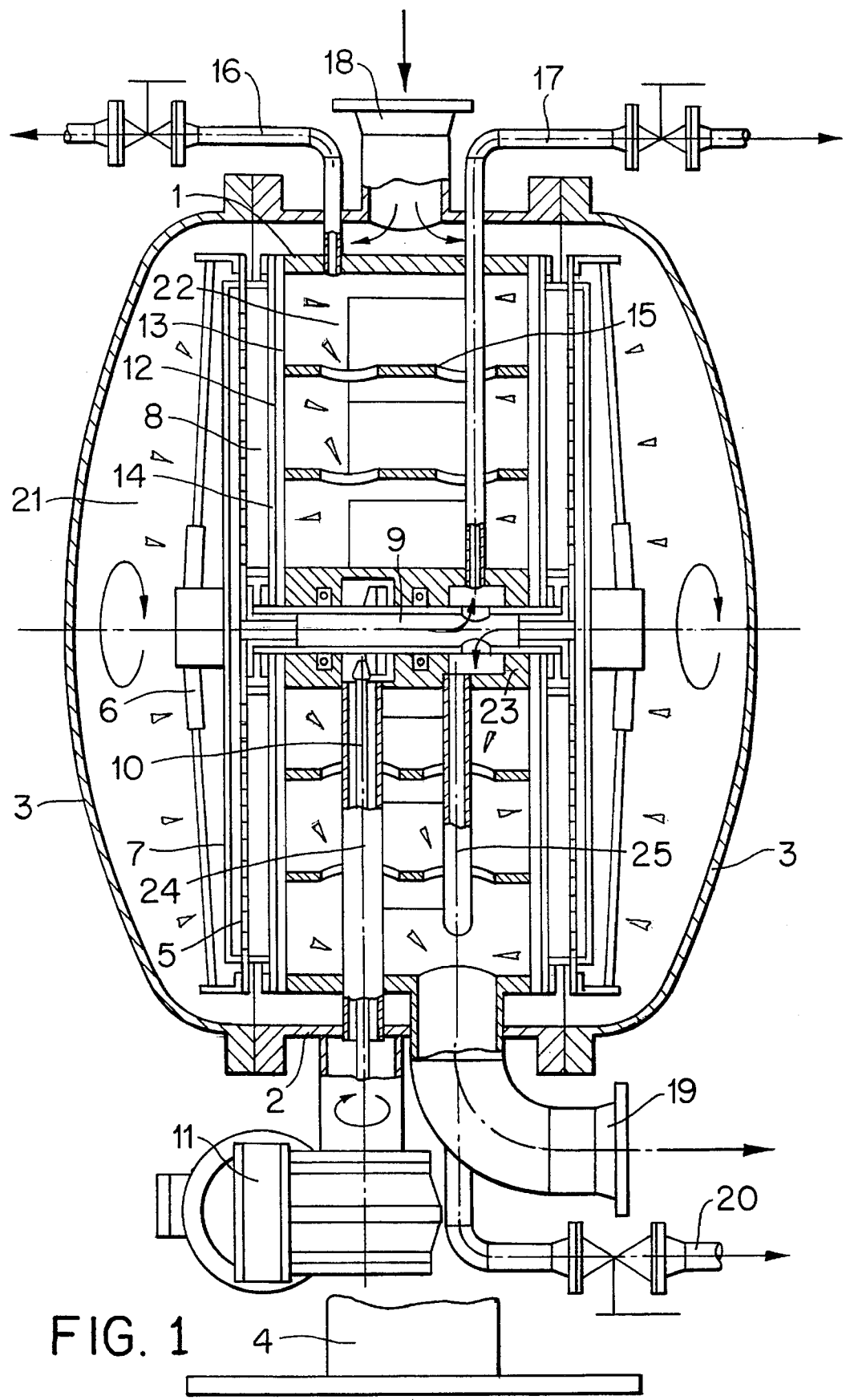
FIG. 1 is a vertical section through an inventive pressure filter.
Figure 2:
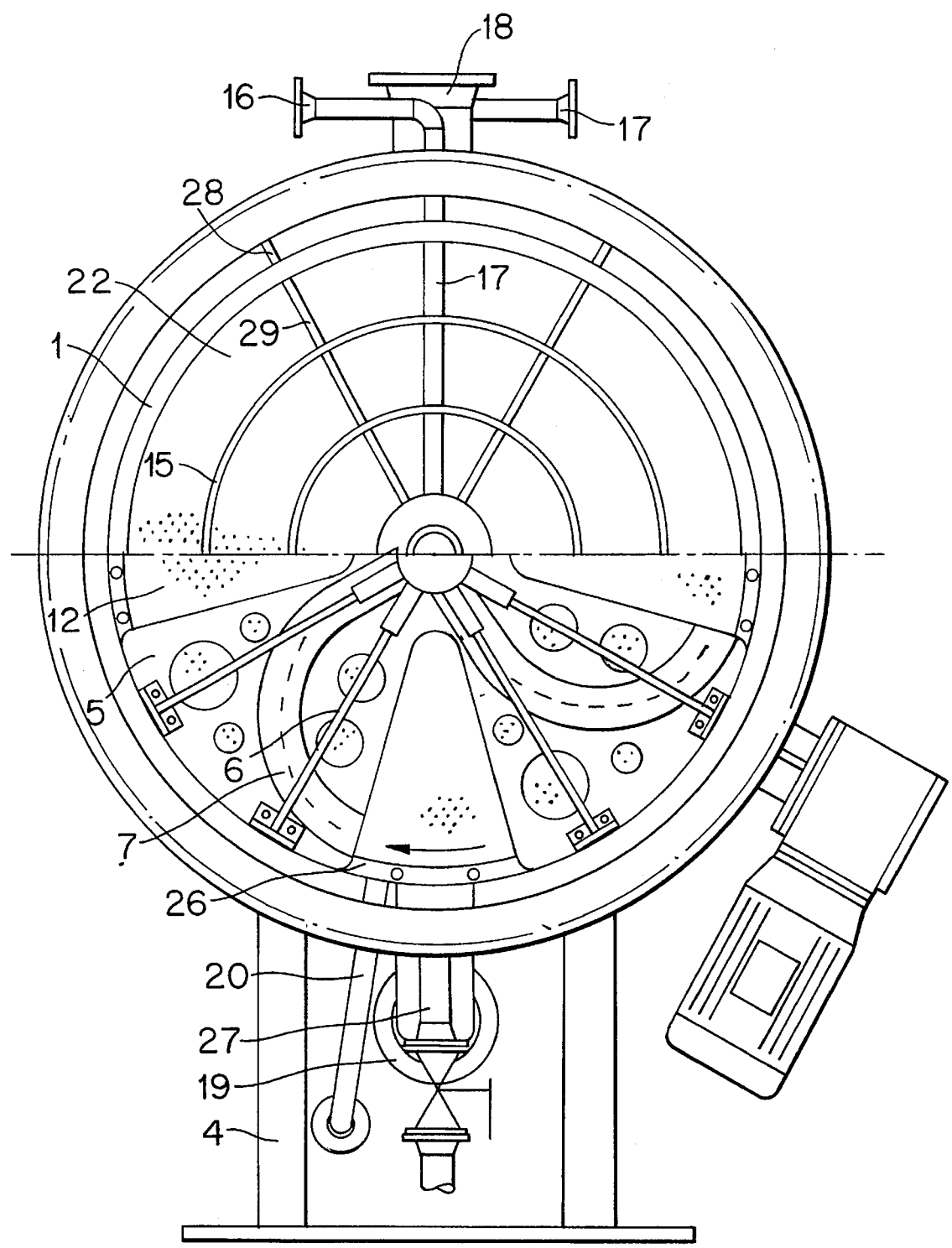
FIG. 2 is a view of the pressure filter of FIG. 1 with removed housing wall and partly removed backwashing head and filter element.

The pressure filter shown in FIGS. 1 and 2 has a carrier ring 1. At the inner side of the carrier ring support rings 15 and ribs 29 are connected to one another in such a manner that a hub 23 is centrally held. The carrier ring 1 is closed by a circular filter element 12 at its both open sides. The filter element is comprised of a first and a second perforated plate 13 between which a suitable filter fleece of textile material is located. These filter elements define a filter surface, respectively. The annular assembly consisting of the carrier ring 1 and the two filter elements 12 is located within a housing 3 which forms a fluid chamber 21 which is supplied with the fluid to be filtered by means of an inlet 18. A filtrate chamber to which a filtrate outlet line 19 is connected is located within the annular assembly consisting of the carrier ring 1 and the filter elements 12.

A hollow shaft 9 open at both ends extends through the hub 23. The hollow shaft is guided through slide bearings, ball bearings and seals which prevent that fluid can enter the hollow shaft range. Connection pieces are mounted into the open ends of the hollow shaft 9 and rotate together with the hollow shaft. A carrier plate 5 is mounted to the flange-like expanding connection piece in a rotatably fixed manner, as described later on in detail.

The interior of the hollow shaft is connected to a ventilation line 17 and to a reject drain 25. Both lines extend through the filtrate chamber and are provided with shut-off valves (shown at 20) outside of the pressure filter, respectively. Also from the filtrate chamber a ventilation line 16 having a suitable shut-off valve extends from the pressure filter to the outside.

The annular assembly consisting of the carrier ring 1, the two filter elements 12 and the support rings 15 and ribs 29 as well as the corresponding lines 16, 17, 19, 25 are stationary within the housing 3.

The pressure filter has two backwashing heads of which each is associated with a filter element 12 and sweeps over the filter surface thereof. The backwashing heads consist of a carrier plate 5 and a plurality of helically curved backwashing slats 8 which are mounted to the carrier plate. The shape of the backwashing slats 8 can be recognized in FIG. 2, wherein there the drain portion 7 of the backwashing slats located above the carrier plate 5 is shown. The carrier plate 5 includes recesses between the individual backwashing slats 8 so that fluid from the fluid chamber 21 can enter the filtrate chamber through the filter surfaces. Resilient means 6 serve for biassing the carrier plate against the filter surface so that the backwashing slats 8 are uniformly pressed against the outer perforated plate 13 and slide along the same.

Suction chambers are disposed within the backwashing slats 8 and are provided with a helically curved slot-like aperture on their side facing the filter surface. The backwashing process is carried out by means of this aperture. The substance formed as cover layer on the filter surface is sucked off by the helical slot-like aperture and is supplied to the reject drain portion 7 of the backwashing slats by means of apertures formed in the carrier plate 5. From the reject drain portion 7 the reject moves radially inwardly into the hollow shaft 9 and from there out of the pressure filter by means of the reject drain 25.

The backwashing heads are driven through the hollow shaft 9 which is connected to a cup gear on its outside which meshes with a bevel gear of a drive shaft 10 disposed in a tube 24 extending through the fluid chamber and the filtrate chamber. The drive shaft 10 is rotated by means of a suitable drive motor 11. The whole pressure filter is disposed on a suitable stand 4.

The backwashing slats 8 of the backwashing head are formed helically or lunated and have a helical or lunated slot-like aperture on their side adjacent to the filter surface. By this design it is guaranteed that each bore in the perforated plates has the same cleaning time, independent of its radial position on the filter element.

In order to prevent that cross flows within the backwashing slats increase the amount of reject or disturb a correct cleaning, the backwashing slats are resiliently supported and adapt themselves to slight unevennesses of the perforated plates. For this the resilient means 6 serves.

In order to guarantee a continuous cleaning it is necessary that the rotating velocity of the carrier plates 5 with the backwashing slats can be continuously controlled which is carried out with the electric motor 11 with prearranged gear box.

The following the function of the pressure filter of FIGS. 1 and 2 is described below.

The fluid chamber 21 is filled with the fluid to be filled with through the inlet 18. Before, the corresponding chambers are ventilated through the lines 16, 17 and a corresponding device in the inlet line 18. A pressure of at least 2 bar is established within the system by the closed reject outlet line 19. Through the automatic control of an outlet valve the pressure in the filtrate chamber 22 is kept constant. The pressure in the fluid chamber is increased by contamination of the filter fleece. When a predetermined pressure is reached the carrier plates 5 of the backwashing head are moved and rotate over the perforated plates 13. Now, on account of the pressure difference between the suction chambers in the backwashing slats 8 and the filtrate chamber 22, clean fluid from the filtrate chamber flows through the fleeces 14 and the slot-like apertures in the the backwashing slats 8 into the reject drain portion 7 thereof and from there into the hollow shaft 9 and through the line 25 out of the filter.

Figure 3:
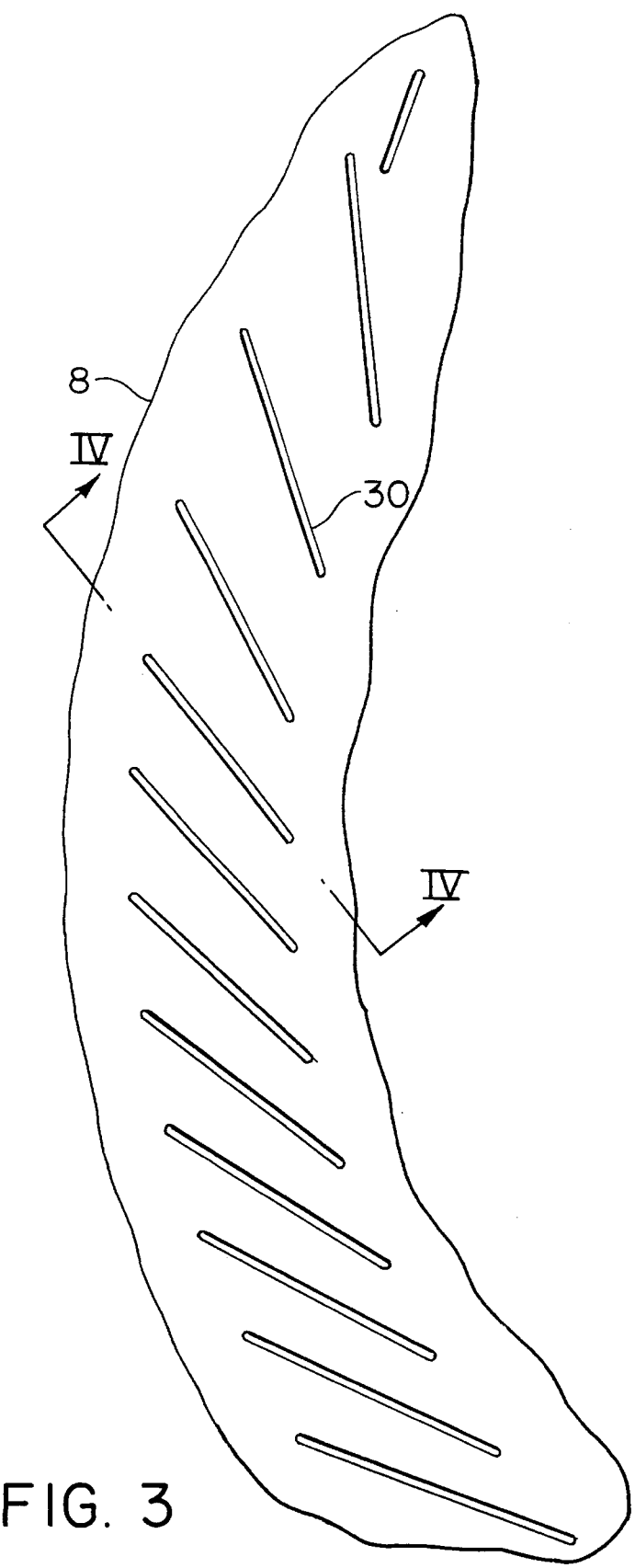
FIG. 3 is a view of a hollow slat of the backwashing head from the side of the filter surface.

According to the embodiment shown in FIGS. 1 and 2 the backwashing slats with their suction portion 8 and their drain portion 7 are formed helically or lunated, wherein also the slot-like aperture disposed at the side of the suction portion 8 of the backwashing slat facing the filter surface has a corresponding lunated or helical shape. FIG. 3 shows an embodiment of a backwashing slat according to which the drain chamber or the drain portion 8 of the slat is also formed lunated or helically. However, in this case no continuous helical and slot-like aperture is provided on the surface facing the filter surface. In place of that a plurality of linear individual slots 30 is provided which are also disposed in a lunated or helical manner and have different angles. With these slots it is also achieved that each aperture of the perforated plate, independent of its radial position, has the same cleaning time, wherein, indeed, the backwashing slat is formed stiffer on the the whole and advantages of production result with this embodiment.

Figure 4:
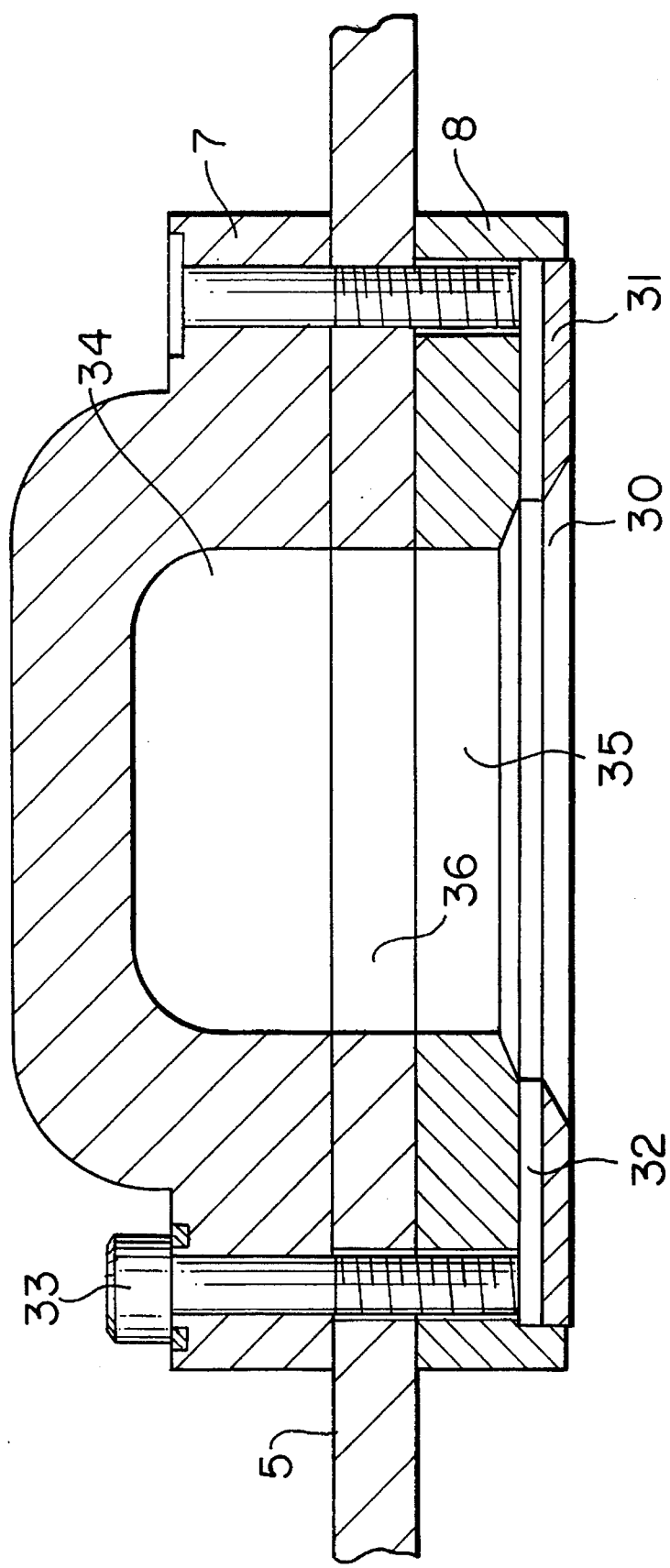
FIG. 4 is a section along line IV—IV in FIG. 3.

FIG. 4 shows a section along line IV—IV in FIG. 3. One recognizes that the carrier plate 5 is disposed above the drain portion 7 and below the suction portion 8 of the backwashing slat. The slot-like aperture 30 located at the lower side of the suction portion 8 narrows towards the carrier plate into a suction chamber 35 which, through an aperture 36 in the carrier plate, passes over to a drain channel 34 leading to the hollow shaft. An oscillation plate 31 is disposed on the side of the slat facing the filter surface and is resiliently supported at 32. The slat is mounted to the carrier plate by means of suitable fastening members 33.

FIG. 2 shows that the carrier plate 5 is approximately formed like a Geneva stop. In order to let as much as possible filter surface uncovered, additional apertures are provided in the carrier plate besides the backwashing slats so that fluid can reach the filter surface also in this range.

I claim:

1. A pressure filter comprising a fluid compartment with a fluid inlet, at least one filter surface in the fluid compartment having a plurality of apertures, one side of the filter surface being restricted by the fluid compartment and the other side thereof being restricted by a filtrate compartment having a filtrate outlet, and a backwashing means with a backwashing head sweeping over the filter surface and sealing a part of the filter surface with respect to the fluid compartment, the backwashing head restricting a backwashing compartment having at least one suction chamber open in a slot-like manner to the filter surface and having connected thereto a reject drain, wherein the slot-like aperture of the suction chamber is formed as a semi-arc of a helix of about 190° and in such a manner that each aperture of the filter surface, independent of its radial position, is swept over by the slot-like aperture in approximately the same space of time.

2. The pressure filter according to claim 1, characterized in that the slot-like aperture is helically formed.

3. The pressure filter according to claim 1, characterized in that the reject drain extends through a hollow shaft for driving the backwashing head and from there out of the filter.

4. A pressure filter comprising a fluid compartment with a fluid inlet, at least one filter surface in the fluid compartment having a plurality of apertures, one side of the filter surface being restricted by the fluid compartment and the other side thereof being restricted by a filtrate compartment having a filtrate outlet, and a backwashing means with a backwashing head sweeping over the filter surface and sealing a part of the filter surface with respect to the fluid compartment, the backwashing head restricting a backwashing compartment having at least one suction chamber open in a slot-like manner to the filter surface and having connected thereto a reject drain, wherein the slot-like aperture of the suction chamber is formed in such a manner that each aperture of the filter surface, independent of its radial position, is swept over by the slot-like aperture in approximately the same space of time the slot-like aperture being formed by a plurality of helically arranged adjacent linear individual slots.

5. A pressure filter comprising a fluid compartment with a fluid inlet, at least one filter surface in the fluid compartment having a plurality of apertures, one side of the filter surface being restricted by the fluid compartment and the other side thereof being restricted by a filtrate compartment having a filtrate outlet, and a backwashing means with a backwashing head sweeping over the filter surface and sealing a part of the filter surface with respect to the fluid compartment, the backwashing head restricting a backwashing compartment having at least one suction chamber open in a slot-like manner to the filter surface and having connected thereto a reject drain, wherein the slot-like aperture of the suction chamber is formed in such a manner that each aperture of the filter surface, independent of its radial position, is swept over by the slot-like aperture in approximately the same space of time the backwashing head having at least one hollow slat supported by a carrier plate and sweeping over the filter surface and provided with the slot-like aperture.

6. The pressure filter according to claim 5, characterized in that the hollow slat is helically formed.

7. The pressure filter according to claim 5, characterized in that the at least one hollow slat includes a suction portion on the side of the carrier plate adjacent to the filter surface and a reject drain portion on the side of the carrier plate facing away from the filter surface.

* * * * *